| United States Patent Office | 3,776,854 |
|---|---|
| | Patented Dec. 4, 1973 |

3,776,854
SULFUR OXIDE ACCEPTORS HAVING HIGH INITIAL ACTIVITY WITH GOOD CHEMICAL AND PHYSICAL STABILITY AND PROCESS FOR THEIR PREPARATION
Frits M. Dautzenberg, Herman W. Kouwenhoven, and Jaap E. Naber, Amsterdam, Netherlands, assignors to Shell Oil Company, New York, N.Y.
No Drawing. Continuation-in-part of application Ser. No. 58,461, July 27, 1970. This application Dec. 1, 1971, Ser. No. 203,843
Claims priority, application Netherlands, Dec. 2, 1970, 7017654
Int. Cl. B01d 53/16; B29d 27/08; C04b 35/18
U.S. Cl. 252—190
16 Claims

ABSTRACT OF THE DISCLOSURE

Highly active copper-containing acceptors suitable for use in removing sulfur oxides from waste gases are prepared by impregnating an alumina-containing support which has been calcined at a temperature above 780° C., with a water soluble compound of aluminum, titanium and/or zirconium either prior to or simultaneously with impregnation of a copper compound.

CROSS-REFERENCE TO RELATED APPLICATIONS

This application is a continuation-in-part of copending U.S. application Ser. No. 58,461, filed July 27, 1970.

BACKGROUND OF THE INVENTION

The invention relates to a process for the preparation of acceptors suitable for the removal of sulfur oxides from gases containing the same.

By the term "acceptor" as herein employed is meant a solid substance which is capable of binding a gas or a gaseous compound either physically or chemically. Such acceptors may comprise a carrier on which one or more metals and/or metal compounds have been deposited. For example, copper and/or copper oxide supported on alumina is very suitable for the removal of sulfur oxides from gases under oxidative conditions. The sulfur oxides—including both sulfur dioxide and sulfur trioxide—are bound by the acceptor as sulfate, thus freeing the gases from sulfur oxides thereby permitting its discharge into the atmosphere without giving rise to air pollution. The loaded acceptor can subsequently be regenerated with a reducing gas which produces a regeneration waste gas rich in sulfur dioxide. This sulfur dioxide-rich gas can be used for the preparation of sulfuric acid or elemental sulfur. The regenerated acceptor is capable of binding fresh quantities of sulfur oxides under oxidative conditions.

Acceptors of the above-mentioned type can be prepared from carriers obtained by mixing aluminum hydroxide or alumina with a suitable binder such as clay, and forming the desired carrier bodies by drying and calcining the resultant mixture at temperatures above 780° C. The finished acceptor is then obtained by depositing on the carrier a metal capable of accepting sulfur oxides by impregnation with a solution of the metal compound. Acceptors prepared in this manner offer the advantage of having a very high physical and chemical stability. Such properties are highly desirable, particularly for acceptors which are subjected to the action of both reducing and oxidizing gases at high temperatures. However, a disadvantage of the finished catalysts prepared in this manner is that they generally show a lower activity than catalysts or acceptors based on alumina-containing carriers which have not been calcined at temperatures above 780° C.

The present invention provides a process for the preparation of acceptors having a high initial activity as well as very good chemical and physical stability and which additionally retain their good activity upon aging.

DESCRIPTION OF THE INVENTION

It has now been found that highly active copper-containing acceptors for sulfur oxides can be prepared by impregnating an alumina-containing carrier which has been calcined at a temperature above 780° C. with an aqueous solution of a water soluble compound of aluminum, titanium and/or zirconium, either prior to or simultaneously with the impregnation of a copper compound. Simultaneous impregnation is preferred and either "dry" or "wet" impregnating techniques may be employed as hereinafter discussed.

Although in principle any soluble compound of the above-mentioned metals can be used for impregnation, it is preferred to use a nitrate and/or sulfate of these metals. It is also preferred to impregnate copper in the form of a sulfate or nitrate.

The alumina-containing carrier used according to the process of the invention preferably contains at least 30% by weight of alumina and may consist entirely of alumina, if desired. In addition to alumina, the carrier may contain other oxidic compounds, such as silica, magnesia, zirconia, thoria and the like.

The process according to the invention is particularly suitable for the preparation of acceptors based on alumina-containing carriers which have been calcined at a temperature between 800° C. and 1800° C., and preferably between 850° C. and 1300° C.

Alumina-containing carriers of the above-described type may be obtained by mixing an alumina, a hydrated alumina and/or aluminum hydroxide with one or more ceramic binders, possibly with the addition of a pore-forming agent and/or a lubricant, by forming the mixture into shaped articles and calcining the said shaped articles at a temperature above 780° C.

The mixture of alumina, hydrated alumina and/or aluminum hydroxide and ceramic binder can be readily shaped into any desired form such as pellets, tablets, extrudates, rings or ceramic castings, for example tiles.

The ceramic binder used may be clays such as kaolin, kaolinite, attapulgite, halloysite, montmorillonite, bentonite and/or sepiolite. The properties and mechanical strength of the finished carrier can be influenced and varied, depending on the type of clay used, as is known by those skilled in the art. Kaolin and/or bentonite are preferred because they are readily available in a pure state and can easily be reduced to the desired particle size.

The amount of ceramic binder used depends to some extent on the type of clay employed and can be readily determined in each particular case. Generally, 0.04 to 1, and more preferably 0.1 to 0.5 part by weight of clay are used per part by weight of alumina.

The carrier bodies obtained in this manner are already slightly porous. However, the porosity can be considerably increased by adding pore-forming agents to the starting material. Suitable agents are combustible substances such as flour, sugar, sawdust, resins, waxes and the like. Highly suitable pore-forming agents are polypivalolactone or polypropylene in particular. The pore-forming agent is preferably used in an amount of 1–25% by weight, and more preferably of 8–15% by weight, based on alumina and binder.

The lubricant used may be stearic acid, polyvinyl alcohol or an emulsion of a synthetic wax.

The mechanical strength of the alumina-containing carriers may be increased by adding a glass to the mixture of alumina and/or hydrated alumina with one or more ceramic binders. The glass to be used preferably has a melting point below the temperature at which the shaped articles are calcined.

The glass is generally employed in the form of glass powder, glass flour or glass frits and be added to the mixture additionally or to replace part of the ceramic binder. The glass is preferably added to the mixture in a quantity of less than 10% by weight (on a dry matter basis). Preferably, the glass is added in an amount of from 1 to 6% by weight. The glass used may be soda-lime glass, boron silicate glass and/or lead glass.

The starting material preferably used in the preparation of the alumina-containing carriers described above is alumina, in particular γ-alumina.

Mixing of the alumina, hydrated alumina or aluminum hydroxide, and the ceramic binder and any other additives such as glass, lubricant and/or pore-forming agent may be effected in any manner known in the art, for example by mixing these materials in a finely divided state either dry or in the presence of water or any other wetting agent. Whatever mixing technique employed, it is preferred that the mixture from which the shaped articles are formed should contain at least 60% by weight, and more preferably 70 to 85% by weight of moisture. After shaping, the shaped articles are usually first air-dried and/or dried at temperatures of approximately 100–120° C. before being calcined at a temperature above 780° C.

The process according to the invention is particularly suitable for the preparation of acceptors for the removal of sulfur oxides from gases containing these oxides. Very good acceptors are obtained by impregnation of the alumina-containing carrier with an aqueous solution of a copper salt and a salt of aluminum, titanium and/or zirconium, which solution contains the copper and aluminum, titanium and/or zirconium in an atomic ratio of from 2:1 to 1:3. More preferably, the copper is applied by co-impregnation with aluminum, by means of an impregnating solution containing these metals in an atomic ratio of from 1:1 to 1:2. Solutions of water are generally used in the impregnation treatment; however, other solvents such as methanol, acetone and the like may also be used or added to the aqueous solution, if desired.

For the use envisaged, the copper content of the copper-containing acceptors may vary within wide limits depending on the specific surface area of the carrier material employed. This content is usually 1–15% by weight, based on the finished carrier. However, optimum results are obtained with acceptors containing 4 to 10% by weight of copper.

After the copper salt and the salt of one or more of the other metals specified have been deposited on the carrier, the latter may, after optional drying, be calcined again, namely at temperatures below 600° C., preferably between 350° C.–550° C. When metal salts are used in the form of a sulfate, in particular copper sulfate, it is preferred to dry the acceptor. When this acceptor is used in the process for the removal of sulfur oxides, this process will be started with the reduction step in which the acceptor is reduced by means of a free hydrogen-containing gas to metallic copper with the evolution of sulfur dioxide. The reduced acceptor is now ready for the removal of sulfur oxides from waste gases under oxidative conditions.

Copper-containing acceptors have the great advantage that after being loaded with sulfur oxides, with the formation of metal sulfate, they can be regenerated at a temperature which is the same or substantially the same as that at which acceptance took place. Operating at acceptance and regeneration temperatures which differ only slightly is advantageous not only from the standpoint of heat economy, but is also of very great importance in respect to prolonging acceptor life. For a process to be economical it is essential for the acceptor used to be capable of being regenerated several thousand times without losing its stability and activity. Such a long life will not be easily achieved with acceptors which have to be heated and/or cooled over a relatively wide temperature range in each regeneration. The chemical and physical stability of the copper-containing acceptors can in fact be consideraby impaired by temperature changes of this type.

The invention also relates to a process for the removal of sulfur oxides from sulfur oxide-containing gases by contacting said gases in the presence of oxygen with a copper-containing acceptor prepared as described above at temperatures of from 325° C. to 475° C., and preferably of from 375° C. to 430° C. After loading with sulfur oxides, the acceptor is regenerated with a reducing gas at temperatures which are in the same temperature range as the acceptance temperature. After regeneration, the acceptor is again contacted with the sulfur oxides-containing gas in the presence of oxygen.

Reducing gases suitable for use in regeneration include hydrogen or hydrogen- and/or carbon monoxide-containing gas mixtures. It is also possible to use light hydrocarbons or mixtures thereof, such as methane, ethane, propane, or technical mixtures such as natural gas or tops obtained in the straight distillation or petroleum. If desired, these reducing gases may be used, diluted with inert gases such as nitrogen and/or water vapor.

Upon regeneration of the copper sulfate-loaded acceptor, a sulfur dioxide-rich gas having a relatively high sulfur dioxide concentration is obtained. Consequently, the process according to the invention is very suitable for treating large quantities of gases or gas mixtures containing relatively low concentrations of sulfur oxides. The sulfur dioxide-rich gas may then be processed to elemental sulfur or sulfuric acid in accordance with known processes. If the process according to the invention is applied to Claus off-gases, the sulfur dioxide-rich regeneration gas can be recycled to the actual Claus process in a simple manner. For processing the gas to sulfuric acid it is advantageous to cool the gas obtained in the regeneration to such an extent that a condensate is formed and to strip the resultant condensate with steam in order to free sulfur dioxide, therefrom.

The invention will be further illustrated by the following examples.

EXAMPLE 1

Alumina-containing carrier material in the form of 10 x 10 cm. $Al_2O_3$ tiles calcined at a very high temperature was partly impregnated with a $Cu(NO_3)_2$-solution in water and partly with an aqueous solution of $Cu(NO_3)_2$ and $Al(NO_3)_3$ by immersing the tiles in the respective solutions. The copper salt concentrations in the two solutions were such that as a result of the absorption of the impregnation solution in the pores of the carrier, the copper content of the acceptors obtained after impregnation was 9% by weight, based on the acceptors. The weight ratio between Cu and Al of the second solution was 11/9. After the tiles had been crushed to 0.8–1.2 mm. particles, the resultant acceptors were tested for their acceptance capacity for sulfur dioxide by means of an accelerated life test hereinafter described. The following Table A shows both the initial acceptance capacity and the acceptance capacity after 500 acceptance/regeneration cycles.

The alumina-containing carrier employed above was obtained as follows:

80 parts by weight of γ-alumina obtained by spray-drying and having a water content of 23% by weight and a particle size of approximately 70μ were placed in an oven in which the temperature was uniformly increased from room temperature to 850° C. The alumina was subsequently sintered for several hours at 850° C. The dehydrated alumina was cooled to room temperature outside the oven and then moistened with 250 parts by volume of water. To the moistened alumina were added, with stirring, 22 parts by weight of kaolin (particle size less than 2μ) in the form of a colloidal suspension in 22 parts by weight of water. The slurry of alumina and clay was filtered off and dried at 100° C. 10% by weight (based on alumina) of a pore-forming agent (polypropylene) was added to the dried mixture which contained approximately 71% by weight of water (based on dry material), after which the total mixture was pressed into 10 x 10 cm. tiles in a known manner. The green tiles were uniformly heated to 1100° C. in an oven and then baked at this temperature for a few hours.

In the accelerated life test a gas comprising 75% by volume of air, 10% by volume of water and 15% by volume of sulfur dioxide is passed over the acceptor at 400° C. for 2.5 minutes at a space velocity of 5000 N l. of gas/l. of acceptor/hour. After purging with nitrogen for 5 minutes the acceptor is regenerated with a reducing gas mixture comprising 90% by volume of propane and 10% by volume of propene which is passed over the acceptor at 400° C. for 2.5 minutes at a space velocity of 1000 Nl./l. of acceptor/hour. After this regeneration step, hot air is passed over the acceptor for 3 minutes at 400° C. after which the above sulfur dioxide-containing gas is again passed over the regenerated acceptor.

For purposes of comparison, acceptors were included in the test which had been obtained by dry impregnation of self-binding $Al_2O_3$-extrudates which had previously been calcined at 500° C. The same percentage by weight of copper had been deposited on these extrudates as on the tiles.

TABLE A

| Carrier | Self-binding $Al_2O_3$-extrudates | Ceramically bound tiles | |
|---|---|---|---|
| Calcined at, °C | 500 | 1,000 | |
| Impregnated with | (1) | (1) | (2) |
| Particle size in acceptance test, mm | 0.8 | 0.8-1.2 | |
| $SO_2$-acceptance capacity mol/100 g. at Cu: | | | |
| Initially | 98 | 44 | 92 |
| After test | 45 | | 70 |

[1] $Cu(NO_3)_2$.
[2] $Cu(NO_3)_2$ plus $Al(NO_3)_3$.

The results show that the initial acceptance capacity of acceptors according to the invention impregnated with $Cu(NO_3)_2$ and $Al(NO_3)_3$ is very good and that the resultant acceptors deactivate considerably less rapidly in the accelerated life test than the acceptors impregnated with $Cu(NO_3)_2$ alone.

EXAMPLE 2

Acceptors based on tiles were prepared in the same manner as described in the preceding example by impregnation with solutions containing $Cu(NO_3)_2$ and $Al(NO_3)_3$. The copper concentration was such that the acceptors contained 9 parts by weight of copper per 100 parts by weight of carrier. The ratio between copper and aluminum in the solution was varied to demonstrate the highly advantageous results achieved with certain copper/aluminum weight ratios. The results obtained are shown in Table B.

TABLE B

| Aluminum in impregnation liquid, percent by weight on total metal load | Initial $SO_2$-acceptance capacity, moles per 100 g. atom of Cu |
|---|---|
| 0 | 44 |
| 19 | 73 |
| 70/30 1:1 | 88 |
| 37 | 93 |
| 41 | 93 |
| 46 1:2 | 86 |
| 52 | 75 |

From the above results it can be deduced that an optimum initial acceptance capacity is obtained at a Cu/Al₂-weight ratio of approximately 3/2. In the above tests a weight ratio of 70% by weight of copper to 30% by weight of aluminum corresponds approximately to a Cu/Al-atomic ratio of 1:1, while a weight ratio of 54% by weight of copper to 46% by weight of aluminum corresponds approximately to a Cu/Al-atomic ratio of 1:2.

With acceptors according to the invention it can be determined visually that the copper is better dispersed on the alumina-containing carrier, since these acceptors are light green in appearance after reduction, whereas reduced acceptors based on carriers calcined at a high temperature on which the copper has been deposited in the absence of an aluminum salt are dark grey to black in appearance.

EXAMPLE 3

A dry mixture was prepared from 1000 g. of $\gamma$ $Al_2O_3$ (water content 30% by weight) obtained by spray drying, 194 g. of kaolin and 40 g. of bentonite as ceramic binders, 79 g. of polypropylene as the pore-forming agent and 19 g. of window glass in the form of glass flour. After the dry mixture had been thoroughly mixed, 1950 cm.³ of water was added and the whole kneaded for 4 hours in a kneading machine. The resultant paste was extruded to extrudates through an extrusion die having a 2 mm. opening. The extrudates formed were first air-dried and subsequently kept at 120° C. for 3 hours. They were then calcined at a final temperature of 1000° C., while air was passed through. The resultant extrudates had the following properties:

Specific surface area _____ m.²/g.___ 117
Pore volume _____ ml./g.___ 0.4
Crushing strength _____ kg./cm.²___ 6.8

These extrudates were impregnated in the dry state with a solution of copper nitrate and aluminum nitrate in a Cu/Al weight ratio of 3/2, the copper concentration being such that the copper content of the extrudates after impregnation was 5 parts by weight of copper per 100 parts by weight of carrier. During the accelerated life test the initial $SO_2$-acceptance capacity was 98 moles of $SO_2$ per 100 g. atom of Cu, while upon completion of this test the said capacity was 70 moles of $SO_2$ per 100 g. atom of Cu. The good physical and chemical stability was shown by the fact that the extrudates had not been crushed to any appreciable extent.

We claim as our invention:

1. In a process for the preparation of a copper-containing acceptor for removing sulfur oxides from gases containing the same wherein a carrier material which contains at least 30% alumina is calcined at a temperature above 780° C. and is impregnated with a solution of a copper compound, the improvement which comprises impregnating said alumina-containing carrier with an aqueous solution of a water-soluble compound of aluminum, titanium or zirconium, either prior to or simultaneously with impregnation of the copper compound.

2. The process of claim 1 wherein the atomic ratio of the copper compound to the aluminum, titanium or zirconium compound is from 2:1 to 1:3.

3. The process of claim 1 wherein the alumina-containing carrier has been calcined at a temperature between 800° C. to 1800° C.

4. The process of claim 2 wherein the aluminum, titanium or zirconium compound is impregnated in the carrier simultaneously with the copper compound by means of co-impregnation.

5. The process of claim 2 wherein the alumina-containing carrier is obtained by mixing an alumina, a hydrated alumina, or aluminum hydroxide with a ceramic binder, forming the resulting mixture into a shaped article and calcining the shaped article at a temperature above 780° C.

6. The process of claim 5 wherein the ceramic binder is clay and is mixed with alumina in the ratio of 0.04 to 1 part by weight clay per part by weight alumina.

7. The process of claim 6 wherein the shaped article is impregnated with a solution of a copper salt and an aluminum salt, said impregnating solution containing copper and aluminum in an atomic ratio of 1:1 to 1:2.

8. The process of claim 6 wherein the copper compound and the water soluble aluminum, titanium or zirconium compounds are the respective sulfate salts of said metals.

9. The process of claim 6 wherein the mixture from which the shaped article is formed additionally contains from 1-25% by weight, based on the alumina and clay, of a combustible pore-forming agent.

10. The process of claim 7 wherein the mixture from which the shaped article is formed additionally contains glass having a melting point below the temperature at which the shaped articles are calcined.

11. The process of claim 7 wherein the copper and aluminum salts are sulfate salts.

12. The process of claim 10 wherein the glass is added in the form of glass flour, glass powder or glass frits in a quantity of 1-6% by weight on the dry matter basis.

13. The process of claim 12 wherein the glass is soda-lime glass.

14. The process of claim 1 wherein after the copper compound and aluminum, titanium or zirconium compound have been impregnated in the alumina-containing carrier, the latter is calcined at a temperature between 350° C. and 550° C.

15. A copper-containing acceptor for $SO_2$ produced by (a) preparing a mixture containing 0.04 to 1 part of a ceramic binder per part of alumina, (b) forming said mixture into a shaped article, (c) calcining said shaped article at a temperature between 800° C. and 1800° C., and (d) impregnating said shaped article with a solution containing a copper salt and a water soluble salt of aluminum, titanium or zirconium in such concentrations that the atomic ratio of copper to aluminum, titanium or zirconium is from 2:1 to 1:3.

16. The copper-containing acceptor of claim 15 wherein the solution employed to impregnate the shaped article contains copper sulfate and aluminum sulfate in such concentrations that the atomic ratio of copper to aluminum is 1:1 to 1:2.

References Cited
UNITED STATES PATENTS

| | | | |
|---|---|---|---|
| 3,495,941 | 2/1970 | Van Helden | 423—244 X |
| 3,551,093 | 12/1970 | Myers et al. | 423—244 |
| 3,630,943 | 12/1971 | Myers et al. | 252—190 |
| 3,672,125 | 6/1972 | Miller | 55—73 |
| 3,501,897 | 3/1970 | Van Helden et al. | 55—74 X |

PHILIP E. ANDERSON, Primary Examiner

U.S. Cl. X.R.

55—73, 387; 252—463; 264—44; 423—244